United States Patent [19]
Fukui

[11] Patent Number: 5,425,339
[45] Date of Patent: Jun. 20, 1995

[54] INTERNAL COMBUSTION ENGINE CONTROL DEVICE

[75] Inventor: Wataru Fukui, Himeji, Japan

[73] Assignee: Mitsubishi Denki Kabushiki Kaisha, Tokyo, Japan

[21] Appl. No.: 207,716

[22] Filed: Mar. 9, 1994

[30] Foreign Application Priority Data

Mar. 23, 1993 [JP] Japan .................. 5-064286

[51] Int. Cl.$^6$ .................. F02P 5/145; F02D 41/14
[52] U.S. Cl. .................. 123/416; 123/478; 123/425; 123/435
[58] Field of Search ........... 123/416, 417, 419, 425, 123/435, 478, 481, 630; 73/116

[56] References Cited

U.S. PATENT DOCUMENTS

| | | | |
|---|---|---|---|
| 4,377,140 | 3/1983 | Latsch | 123/425 |
| 4,491,110 | 1/1985 | Bone et al. | 123/425 |
| 5,146,893 | 9/1992 | Oheawa | 123/425 |
| 5,215,067 | 6/1993 | Shimasaki et al. | 123/630 |
| 5,309,884 | 5/1994 | Fukui et al. | 123/481 |
| 5,337,716 | 8/1994 | Fukui et al. | 123/425 |
| 5,343,844 | 9/1994 | Fukui et al. | 123/481 |

*Primary Examiner*—Willis R. Wolfe
*Attorney, Agent, or Firm*—Sughrue, Mion, Zinn, Macpeak and Seas

[57] ABSTRACT

An internal combustion engine control device improving the combustion state without increasing the cost. Such a control device comprises: an angle detection section for generating a reference position signal indicating a predetermined crank angle position of a cylinder of an internal combustion engine; a drive state detection section for detecting a drive state of the internal combustion engine; an ion current detection section for detecting an ion current in the cylinder so as to produce an ion current value; an ion current determining section for producing a peak value of the ion current value and a pulse width of the ion current value which is the same or greater than a predetermined level so as to output the peak value and the pulse width as first and second determined values, respectively; and a control parameter setting section for setting a control parameter of the internal combustion engine on the basis of the reference position signal and the drive state, the control parameter setting section varying the control parameter so that the product of the first and second determined values is maximized. Thus, the combustion state in the internal combustion engine is accurately determined, thereby enabling the feedback control of the control parameter.

7 Claims, 6 Drawing Sheets

INTERNAL COMBUSTION ENGINE CONTROL DEVICE

BACKGROUND OF THE INVENTION

1. Field of the Invention

The present invention relates to an internal combustion engine control device which determines the combustion state in the internal combustion engine on the basis of ion current value detected from a cylinder after combustion, so as to set control parameters of the internal combustion engine according the determined combustion state. More particularly, the invention relates to an internal combustion engine control device which feedback-controls control parameters according to the determination results of the ion current value, thereby improving the combustion state in the internal combustion engine without increasing the cost.

2. Description of the Related Art

FIG. 3 is a block diagram showing the construction of a conventional internal combustion engine control device. Such a control device is applied to only some high-grade automobiles.

Referring to FIG. 3, the conventional internal combustion engine control device comprises: angle detection means 10 which is formed of, for example, a rotation plate and is synchronized with the rotation of the internal combustion engine so as to generate a pulsating reference position signal $T\theta$ for indicating the reference position of each of the cylinders in correspondence with a predetermined crank angle; various kinds of sensors 20 for detecting the drive state D indicative of a load to an internal combustion engine, such as the air flow rate (throttling rate), rotation number, suction temperature, and the like; ion current detection means 30 for detecting the ions produced by the combustion of the cylinders so as to generate the ion current value I; cylinder internal pressure sensor 40 provided for each of the cylinders so as to detect the cylinder internal pressure Pc; and control means 50 including a microcomputer, and the like.

The angle detection means 10 for generating the reference position signal $T\theta$ is provided for a crank shaft or a cam shaft of an internal combustion engine so that the reference position signal $T\theta$ indicates a predetermined reference position corresponding to the crank angle (the rotation angle of the crank shaft). The reference position is used as the reference of the timer control for the control parameters of the ignition timing, or the like, and is generally set to be, for example, B75° (75° before the top dead center) and B5°, etc.

The ion current detection means 30 for detecting failures, for example, a misfire, of an internal combustion engine is provided for all or certain cylinders according to the necessity.

Referring to FIG. 3, the control means 50 comprises a control parameter setting section 60 for calculating control parameters of the ignition timing, or the like, for each of the cylinders on the basis of the reference position signal $T\theta$ and the drive state D and calculated varying the control parameters according to the cylinder internal pressure Pc so as to output the resultant control parameters Ta; and an ion current determining section 70 for comparing the ion current value I with the reference level according to the reference position signal $T\theta$ and determining the combustion state, such as a misfire, in an internal combustion engine so as to output a determining signal C.

The control parameter setting section 60 produces control parameters Ta indicative of, for example, the control duration, corresponding to the ignition timing, and also executes the following processes. For example, when the determining signal C indicates a misfire, the control parameter setting section 60 executes a misfire inhibiting process on the targeted misfiring cylinder by means of increasing the ignition power supply capacity, or the like, and also executes a process for inhibiting the discharge of the unburned gas caused by fuel injection stoppage. The control parameter setting section 60 further varies the calculated control parameters according to the cylinder internal pressure Pc so that the combustion state is optimal, thereby outputting the resultant control parameters Ta. The control parameters Ta comprise various elements such as not only ignition timing, but also fuel injection timing, the duration for supplying the power to an ignition coil.

FIG. 4 shows the schematic construction of the internal combustion engine and is also a circuit diagram indicating the ion current detection means 30 shown in FIG. 3.

Referring to FIG. 4, the internal combustion engine comprises an ignition coil 81 having a primary winding 81a and a secondary winding 81b; a power transistor 82 for cutting off the current i1 supplied to the primary winding 81a by the ignition pulse P corresponding to the ignition timing; and an ignition plug 83 discharged by a high voltage which generates in the secondary winding 81b.

The ion current detection means 30 comprises a DC power supply 31 having a voltage of a range from 100 V to 200 V for discharging ions, which is used as the ion current i, produced by discharge explosion in the ignition plug 83; a resistor 32 connected in series to the DC power supply 31 for converting the ion current i into a voltage signal; an output terminal 33 for outputting the detected value I of the ion current i as a voltage signal; and a reverse-current preventing diode 34 connected parallel to the DC power supply 31 and the resistor 32.

The output terminal 33 for outputting the ion current value I is connected to the ion current determining section 70 of the control means 50 through a wave-form shaping circuit (not shown).

If the discharge explosion fails to be performed due to a misfire of a cylinder which is to be controlled in the ignition cycle, an abnormal explosion referred to as afterburning is caused after the ignition cycle, thereby damaging the cylinders or injuring the catalyst used for disposing the exhaust gas due to exhausting the unburned gas. Thus, it is necessary to detect the combustion state in each of the cylinders, and when a misfire is detected, for example, it is necessary to take various measures to avoid further misfires in order to protect the internal combustion engine.

In view of the above background, a conventional internal combustion engine control device includes the ion current detection means 30 for detecting ions produced in a cylinder in which the fuel is burning as the ion current i. However, the ion current value I from the ion current detection means 30 can be used only for determining whether a misfire has occurred and for identifying in which cylinder the fuel is burning.

Also, in order to maintain the optimal combustion state in the internal combustion engine, it is necessary, for example, to set the ignition timing to match the optimal crank angle according to the drive state and to control the fuel injection volume so that the air fuel ratio is equal to the theoretic mixture ratio (14.7). If the control parameters Ta of the ignition timing, the fuel injection volume, and the like, are set by the above open loop control, the optimal combustion state cannot be reliably maintained.

In order to overcome the above drawback, a conventional internal combustion engine control device includes an cylinder internal pressure sensor 40 for detecting the cylinder internal pressure Pc of the cylinder in which the fuel is burning. The control parameter setting section 60 varies the control parameters Ta according to the fed-back cylinder internal pressure Pc in the course of burning so that the combustion state is optimal. However, the cylinder internal pressure sensor 40 is expensive, thus increasing the cost.

The operation of the conventional internal combustion engine control device will now be described with reference to FIGS. 3-5.

FIG. 5 shows a wave form indicative of the ion current i and the ignition pulse P in which the primary current I1 of the ignition coil 81 is cut off by the ignition pulse P so as to cause a discharge explosion in the ignition plug 83 which is ignited, thus increasing the ion current i as the flame grows.

In general, the control parameter setting section 60 controls, for example, the ignition timing by the following process. It sets the rising and falling timings of the pulsating reference position signal Tθ as the reference position and also finds the optimal ignition timing according to the drive state D with reference to the values in the map, thus calculating the control duration starting from the reference position to the ignition timing used as the control parameter Ta. The above map comprising the ignition timing data corresponding to the drive state D is obtained by experiment or other means in advance and stored in a memory (not shown) of the control means 50.

The ion current determining section 70 identifies the combustion state in each of the cylinders in the ignition cycle on the basis of the reference position signal Tθ from the angle detection means 10 and the ion current value I from the ion current detection means 30, and when the ion current value I in the explosion process is smaller than the threshold value, for example, the ion current determining section 70 generates a determining signal C indicating that a misfire has occurred in the targeted cylinder.

When such a determining signal C is input, the control parameter setting section 60 varies the control parameter Ta so that the targeted cylinder can be inhibited from misfiring.

More specifically, the conventional internal combustion engine control device increases the ignition energy, in other words, increases the duration for supplying the primary current I1 to the ignition coil 81, so as to ensure the ignition of the ignition plug 83, or it makes the air fuel mixture rich or lean by increasing or decreasing the fuel injection duration, respectively, thereby confirming whether it is possible to avoid a misfire by such means of adjusting the ratio of the air fuel mixture. Further, if such a misfire state is not improved by varying the control parameter Ta which is targeted for avoiding misfires, the fuel injection to the misfiring cylinder is stopped, thereby preventing the unburned gas from being exhausted.

Ignition is performed in the cylinders by the following general process. When the power transistor 82 is cut off by the ignition pulse P, the negative-polar high voltage is applied to the ignition plug 83 connected to the secondary winding 81b so as to cause the discharging across the electrodes of the ignition plug 83, thereby igniting the air fuel mixture. Such an ignition further brings about the explosive combustion so as to produce ions in the exploded cylinder due to the ionization tendency. At the same time, a biasing voltage of the DC power supply 31 is applied to the electrodes of the ignition plug 83 which have already been discharged, and consequently, such electrodes serve the function of detecting the ion current i.

The resultant ions in the cylinder flow as the ion current i by the positive-polar biasing of the DC power supply 31 and such an ion current i is converted into the detected value I by the resistor 32 so as to be output from the output terminal 33. As a result, the ion current determining section 70 simply refers to a pulse obtained by wave-form shaping the ion current value I of the pealhold value or the ion current value I greater than the threshold value, thereby determining whether the cylinder in the ignition cycle are reliably ignited.

Since the level of the ion current value I varies depending upon the reference position signal Tθ, a threshold value for comparison for detecting a misfire is also appropriately varied in accordance with the reference position signal Tθ.

It is not possible to determine the correct combustion state from only the ion current value I, for example, the peak value of the ion current value I, and thus, the suitable control parameters Ta cannot be set.

A description will now be given in detail of the ion relationship between the control parameters Ta and the current value I with reference to FIGS. 6-8.

FIG. 6 shows typical wave forms indicating peak values and pulse widths of the ion current values. I indicates the ion current values in the good combustion state and in the failed combustion state indicated by the solid line and one-dot chain line, respectively. FIG. 6 also indicates a threshold value TH, a peak value IP and a pulse width IW.

FIG. 7 is a characteristics diagram indicating the pulse width IW and the peak value IP with respect to the air fuel ratio. As is seen from FIG. 7, the peak value IP shows its maximum with respect to the theoretic mixture ratio (14.7), but the ion current value I is superimposed on a noise component and the peak value IP is thus, for example, erroneously detected. As a result, the maximum of the peak value IP tends to be varied, thus lowering the reliability. The pulse width IW also shows its maximum with respect to the theoretic mixture ratio, but is inclined to soar again when the air fuel ratio is lean.

FIG. 8 is a characteristics diagram indicating the pulse width IW with respect to the ignition timing. As is seen from FIG. 8, the pulse width IW substantially shows its maximum with respect to the optimal ignition timing MBT, but is inclined to soar again due to knocking, or the like, when the ignition timing is more advanced.

As can be clearly understood from FIGS. 7 and 8, with respect to the controls of the air fuel ratio and ignition timing, it is difficult to vary the control parameters Ta by the closed-loop control from only either the peak value IP or the pulse width IW of the ion current value I.

Therefore, the cylinder internal pressure sensor 40 is provided for each of the cylinders, thereby varying the control parameters by the closed loop control according to the cylinder internal pressure Pc. As stated above, however, the cylinder internal pressure sensor 40 increases the cost.

As described above, the conventional internal combustion engine control device uses the ion current detection means 30 and determines the combustion state the basis of either the peak value IF or the pulse width IW of the ion current detection value I. Thus, although the control device is capable of determining failures such as a misfire, it cannot identify the specific combustion states, for example, the theoretic mixture ratio, thus failing to vary the control parameters by the closed-loop control.

The above problem can be solved by using the cylinder internal pressure sensors 40 so as to detect the specific combustion states, such as the air fuel ratio, of an internal combustion engine but such a method results in an increase in the cost.

SUMMARY OF THE INVENTION

Accordingly, in order to solve the above problems, an object of the present invention is to provide an internal combustion engine control device which feedback-controls a control parameter according to the results of determining the ion current value so as to improve the combustion state without increasing the cost.

In order to achieve the above objects, there is provided an internal combustion engine control device comprising: angle detection means for generating a reference position signal indicating a predetermined crank angle position of a cylinder of an internal combustion engine; drive state detection means for detecting a drive state of the internal combustion engine; ion current detection means for detecting an ion current in the cylinder so as to produce an ion current value; an ion current determining section for producing a peak value of the ion current value and a pulse width of the ion current value which is the same or greater than a predetermined level so as to output the peak value and the pulse width as first and second determined values, respectively; and a control parameter setting section for setting a control parameter of the internal combustion engine on the basis of the reference position signal and the drive state, the control parameter setting section varying the control parameter so that the product of the first and second determined values is maximized.

DESCRIPTION OF THE PREFERRED EMBODIMENTS

Figure 1:
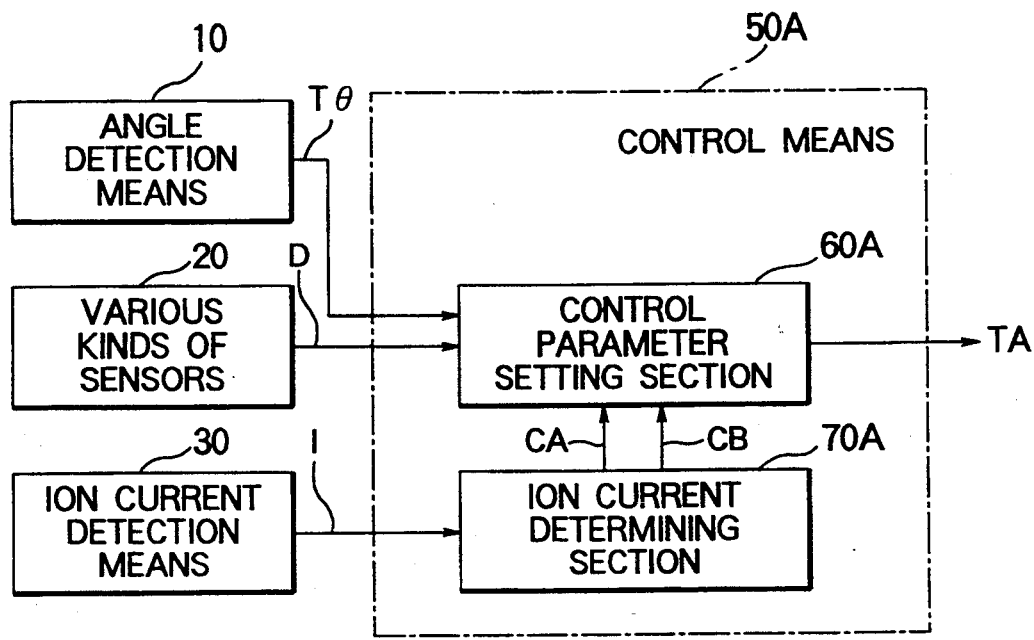
FIG. 1 is a block diagram showing the construction of one embodiment of the present invention.
Figure 3:
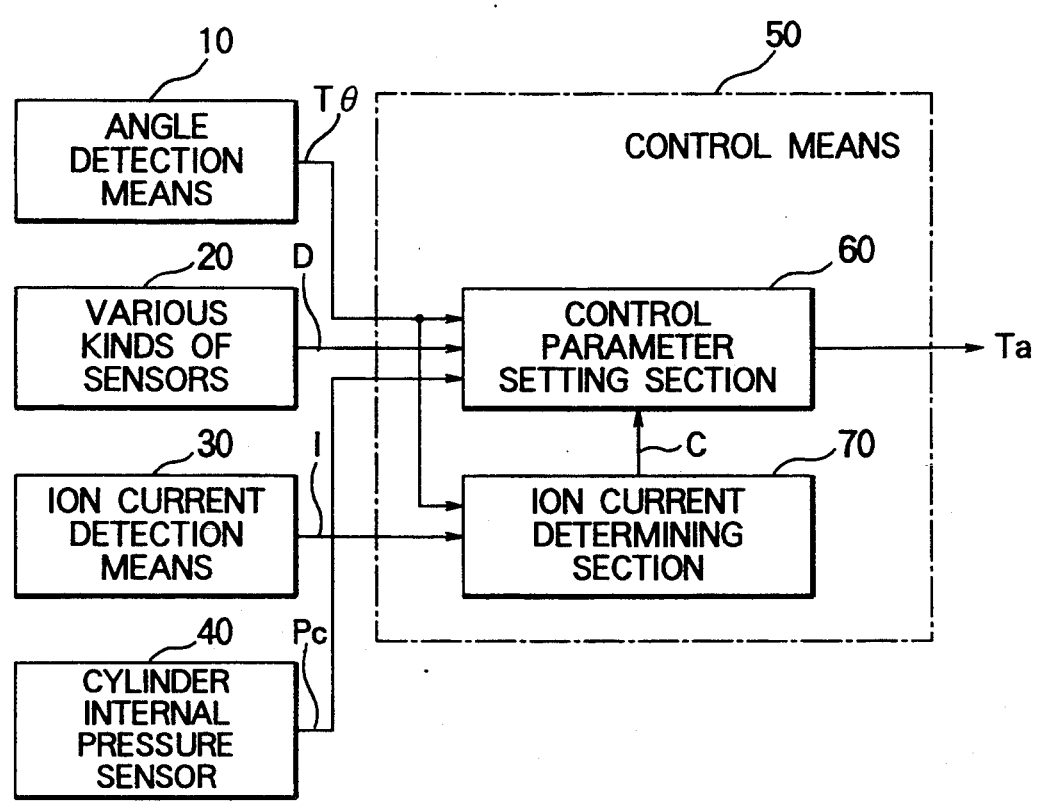
FIG. 3 is a block diagram showing an example the construction of a conventional internal combustion engine control device.
Figure 4:
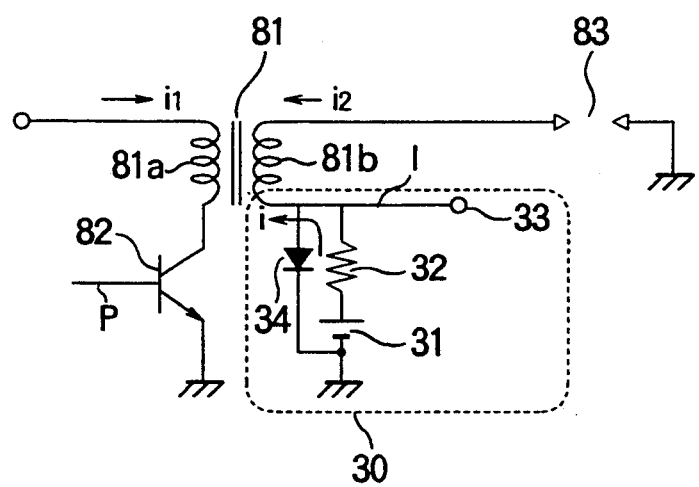
FIG. 4 is a circuit diagram showing typical ion current detection means shown in FIGS. 1 and 3.
Figure 5:
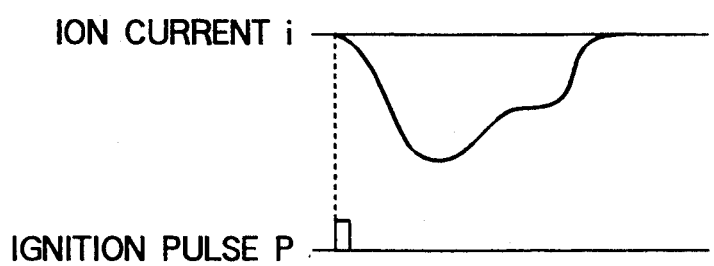
FIG. 5 shows a wave form indicating a typical ion current.

The construction of one embodiment of the present invention will now be described below with reference to FIGS. 1 and 2. Referring to FIG. 1, angle detection means 10, various kinds of sensors 20 and ion current detection means 30 are all identical as those in the conventional internal combustion engine control device shown in FIG. 3. The construction of the ion current detection means 30 is similar to the one shown in FIG. 4.

This embodiment comprises the angle detection means 10, the various kinds of sensors 20, the ion current detection means 30 and control means 50A including a microcomputer (CPU).

The control means 50A comprises a control parameter setting section 60A for varying the control parameter so that the product of the determined values CA and CB is maximized, which product is equivalent to the wave-form area of the ion current value I; and an ion current determining section 70A for producing the determined values CA and CB equivalent to the peak value IP and the pulse width IW, respectively, of the ion current value I and using these values as the determination results.

Figure 2:
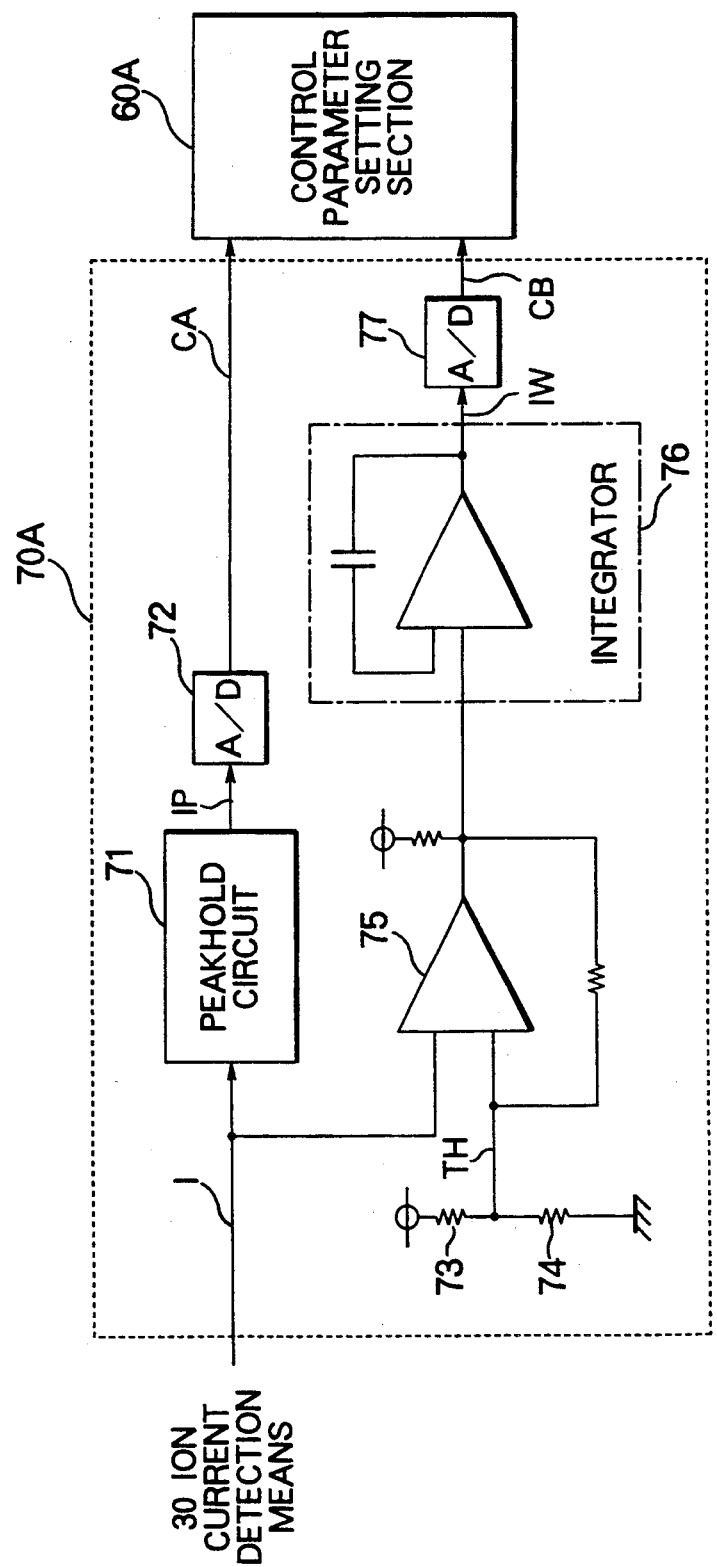
FIG. 2 is a circuit diagram showing an example the construction of the ion current determining section shown in FIG. 1.

Referring to FIG. 2, the ion current determining section 70A comprises a peakhold circuit 71 for producing the peak value IP of the ion current value I; an A/D converter 72 for A/D converting the peak value IP and outputting the determined value CA; voltage divide resistors 73 and 74 for producing the threshold value TH used as a comparative reference; a comparator 75 for comparing the ion current value I with the threshold value TH so as to output the wave form of the detected value I greater than the threshold value TH as a rectangular-wave signal; an integrator 76 for voltage-converting (analog-converting) the rectangular-wave signal so as to produce the pulse width IW; and an A/D converter 77 for A/D converting the pulse width IW and outputting the determined value CB.

The operation of this embodiment will now be explained with reference to FIGS. 1, 2, 4–8.

The control parameter setting section 60A in the control means 50A calculates the control parameter on the basis of the reference position signal $T\theta$ and the drive state D so as to set the resulting parameter TA. It also varies the control parameter in response to the product of the determined values CA and CB.

The peakhold circuit 71 and the integrator 76 in the ion current determining section 70A produce the peak value IP and the pulse width PW, respectively, both of which are A/D converted by the A/D converters 72 and 77, respectively, so as to be input into the control parameter setting section 60A in the control means 50A.

The control parameter setting section 60A first compares the determined value CA equivalent to the peak value IP with a predetermined value $\alpha$ and also compares the determined value CB equivalent to the pulse width IW with a predetermined value $\beta$. Then, it determines whether the current combustion state is within a predetermined combustion range depending upon whether the comparison results satisfy the following conditions.

$CA > \alpha$

CB > β

Figure 6:
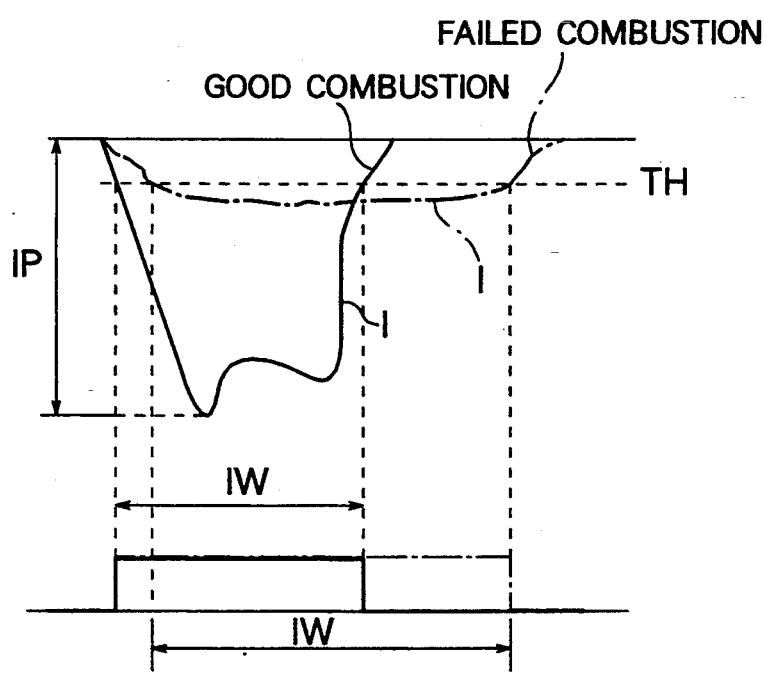
FIG. 6 is a diagram indicating the peak values and the pulse widths of typical ion current values.

When the control parameter setting section 60A confirms that the comparison results satisfy both the above conditions and determines that the current combustion state is within a predetermined combustion range, it varies the control parameter by a predetermined value so that the product of the determined values CA and CB is maximized, that is, the wave-form area of the ion current value I is substantially maximized within the above combustion range. This can be easily achieved for the following reasons. For example, if the wave form of the ion current value I shown in FIG. 6 is generally triangle, the wave-form area can be found by the following expression: (base×height)/2, and if the wave form of the ion current value I is generally trapezoid, the wave-form area can be similarly found by the following expression: (the sum of the lengths of the parallel sides)×height/2.

Figure 7:
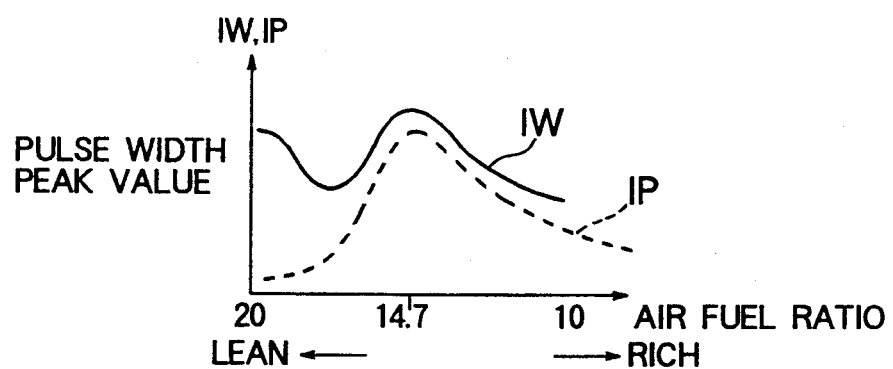
FIG. 7 is a characteristics diagram showing the pulse width and the peak value of the ion current value with respect to a typical air fuel ratio.

When the control parameter TA is the fuel injection volume, that is, the air fuel ratio, for example, a change in the air fuel ratio also varies the pulse width IW and the peak value IP, as illustrated in FIG. 7. The control parameter setting section 60A thus feedback-controls the control parameter TA while gradually changing the fuel injection volume from an injector (not shown) to be greater or smaller than the values in the map MA by a considerably small volume, thus setting the control parameter TA so that the product of the determined values CA and CB equivalent to the peak value IP and the pulse width IW, respectively, is maximized.

Figure 8:
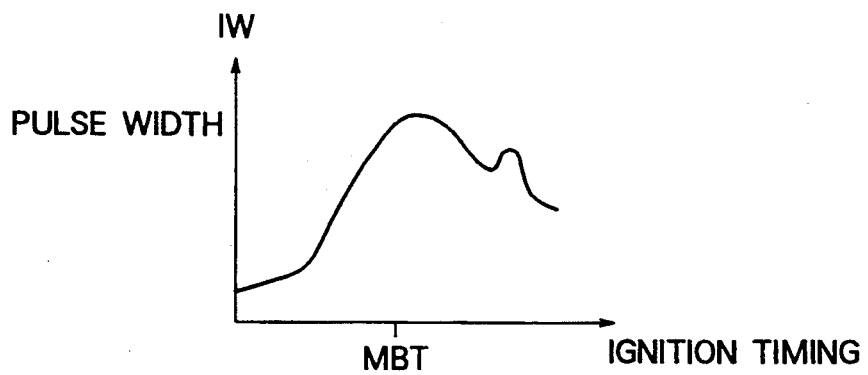
FIG. 8 is a characteristics diagram showing the pulse width of the ion current value with respect to a typical ignition timing.

Similarly, when the control parameter TA is the ignition timing, a change in the ignition timing also varies the pulse width IW, as illustrated in FIG. 8. The control parameter setting section 60 thus feedback-controls the control parameter TA while gradually advancing and retarding the ignition timing of the ignition coil 81 more than the values in the map MB by a considerably small degree, thus setting the control parameter TA so that the product of the determined values CA and CB is maximized.

The above maps MA and MB comprise the fuel injection volume data and the ignition timing data, respectively, corresponding to the drive state D. They are obtained by experiment or other means in advance and stored in a memory (not shown) of the control means 50A.

As a result, the internal combustion engine is controlled in such a way that the air fuel ratio or the ignition timing is optimal, thus maintaining the optimal combustion state by the closed-loop control. During the above operation, each of the parameters (the fuel injection volume, the ignition timing, etc.) is varied and the determined values CA and CB are fed back independently of other individual control parameters TA.

Even though the peak value IP happens to be greater than a predetermined value a because the detected value I is superimposed on the noise or the other elements, the control parameter setting section 60A also determines whether the pulse width IW is greater than a predetermined value β, thus being free from erroneous determination of the combustion state and further enhancing high reliability.

In this embodiment, the control parameter is varied by the closed-loop control by using the ion current detection means 30 generally provided for the control device, and thus, it is not necessary to burden the components of the control device including the control means 50A, for example, to add sensors thereto, which does not particularly result in an increase in the cost.

This embodiment also comprises the ion current determining section 70A having peak value producing means and pulse width producing means in which the determined values CA and CB equivalent to the peak value IP and the pulse width IW, respectively, are produced, thus simplifying the construction of the ion current determining section 70A, the reference for determining the combustion state, or the like.

Although the ion current determining section 70A produces the determined values CA and CB equivalent to the peak value IP and the pulse width IW, respectively, in this embodiment, the ion current determining section 70A may comprise calculating means, such as, a digital signal processor (DSP) and software, thereby directly finding an integrated value within a range of a predetermined crank angle (from $\theta 1$ to $\theta 2$) of the wave form of the ion current value I by calculating the following integration, and the resultant value may be used as the determined value CC.

$$CC = \int I \cdot d\theta$$

The above range of a predetermined crank angle (from $\theta 1$ to $\theta 2$), that is, the integration range, is obtained by the reference position signal $T\theta$ from the angle detection means 10 and set at a range approximately between TDC (top dead center) and A60° (60° after the TDC to retard the ignition timing).

The control parameter setting section 60A sets the control parameter TA so that the determined value CC is maximized, and more specifically, the air fuel ratio or the ignition timing is optimal, thus maintaining the optimal combustion state by the closed-loop control.

Although the control parameter setting section 60A in each of the above embodiments unconditionally fetches the determined values CA and CB or the determined value CC of the ion current value I, which values vary the control parameter TA, it may first ensure the reliability of such determined values for a predetermined period (a range between a few seconds and a few dozens of seconds) equivalent to the few dozens of cycles of the internal combustion engine and then perform the feedback control.

For example, the control parameter setting section 60A calculates the dispersion of at least one of the determined values CA and CB for the above predetermined period and it performs the feedback control on the basis of the determined value when the resultant amount of deviation ΔCA or ΔCB is a predetermined amount Γ or less. According to this method, when the peak value I or the pulse width IW is abnormally displaced, the erroneous controlling by the control parameter setting section 60A can be avoided.

As will be clearly understood from the foregoing description, the present invention offers the following advantages.

The control parameter is varied so that the product of the determined values CA and CB is maximized, which product is equivalent to the wave-form area of the ion current value I and the combustion state in the internal combustion engine is correctly determined, thereby enabling the feedback controlling of the control parameter TA and further improving the combustion state without increasing the cost. Also, the ion current determining section 70A can be partially constructed of a simple circuit.

What is claimed is:

1. An internal combustion engine control device comprising:
   angle detection means for generating a reference position signal indicating a predetermined crank angle position of a cylinder of an internal combustion engine;
   drive state detection means for detecting a drive state of said internal combustion engine;
   ion current detection means for detecting an ion current in said cylinder so as to produce an ion current value;
   an ion current determining section for producing a peak value of the ion current value and a pulse width of the ion current value which is the same or greater than a predetermined level so as to output said peak value and said pulse width as first and second determined values, respectively; and
   a control parameter setting section for setting a control parameter of said internal combustion engine on the basis of said reference position signal and said drive state, said control parameter setting section varying said control parameter so that the product of said first and second determined values is maximized.

2. An internal combustion engine control device according to claim 1 wherein said ion current determining section includes peak value producing means for producing the peak value of said ion current value and pulse width producing means for producing the pulse width of said ion current value which is the same or greater than a predetermined level.

3. An internal combustion engine control device according to claim 2 wherein said peak value producing means includes a peakhold circuit for producing the peak value of said ion current value and an A/D converter for converting said peak value into a digital value.

4. An internal combustion engine control device according to claim 2 wherein said pulse width producing means includes a voltage divide resistor for producing a threshold value; a comparator for comparing said ion current value with said threshold value and producing a rectangular-wave signal of said ion current value greater than said threshold value; an integrator for voltage-converting said rectangular-wave signal so as to produce a pulse width; and an A/D converter for converting said pulse width into a digital value.

5. An internal combustion engine control device according to claim 1 wherein said control parameter setting section calculates the dispersion of at least one of said first and second determined values for a few dozens of ignition cycles of said internal combustion engine and performs the feedback control on the basis of said first and second determined values when the resultant amount of deviation is the same or smaller than a predetermined value.

6. An internal combustion engine control device comprising:
   angle detection means for generating a reference position signal indicating a predetermined crank angle position of a cylinder of an internal combustion engine;
   drive state detection means for detecting a drive state of said internal combustion engine;
   ion current detection means for detecting an ion current in said cylinder so as to produce an ion current value;
   an ion current determining section for directly integrating said ion current value starting from a top dead center to a predetermined angle on the basis of said reference position signal so as to output the integrated value as a determined value; and
   a control parameter setting section for setting a control parameter of said internal combustion engine on the basis of said reference position signal and said drive state, said control parameter setting section varying said control parameter so that said determined value is maximized.

7. An internal combustion engine control device according to claim 6 wherein said control parameter setting section calculates the dispersion of said determined value for a few dozens of cycles of said internal combustion engine and performs the feedback control on the basis of said determined value when the resultant amount of deviation is the same or smaller than a predetermined value.

* * * * *